United States Patent [19]

Fikentscher et al.

[11] Patent Number: 4,936,864

[45] Date of Patent: Jun. 26, 1990

[54] CONDENSATES OF BIS-(4-HYDROXYPHENYL) SULFONE AS TANNING ASSISTANTS, THEIR PREPARATION AND USE IN THE TANNING OF LEATHER

[75] Inventors: Rolf Fikentscher, Ludwigshafen; Dietrich Lach, Friedelsheim; Ortwin Schaffer, Ludwigshafen; Rolf Streicher, Worms; Alfred Oftring, Ludwigshafen, all of Fed. Rep. of Germany

[73] Assignee: BASF Aktiengesellschaft, Ludwigshafen, Fed. Rep. of Germany

[21] Appl. No.: 246,624

[22] Filed: Sep. 20, 1988

[30] Foreign Application Priority Data

Sep. 22, 1987 [DE] Fed. Rep. of Germany ....... 3731810

[51] Int. Cl.$^5$ ................................................ C14C 3/04
[52] U.S. Cl. ..................................... 8/94.29; 8/94.24; 8/94.25
[58] Field of Search .............. 8/94.19 R, 94.23, 94.25, 8/94.29

[56] References Cited

FOREIGN PATENT DOCUMENTS 89979 12/1896 Fed. Rep. of Germany .

OTHER PUBLICATIONS

Journal of American Leather Chem. Assoc., vol. 76, 1981, pp. 230-244.
Zhurnal Organicheskoi Khimii, vol. 7, No. 2, pp. 327-330, Feb., 1971.
CA 79(2):6818a (1973).

Primary Examiner—Paul Lieberman
Assistant Examiner—John F. McNally
Attorney, Agent, or Firm—Oblon, Spivak, McClelland, Maier & Neustadt

[57] ABSTRACT

A condensate of bis-(4-hydroxyphenyl) sulfone, an aldehyde, a dialdehyde and/or glyoxylic acid and aminoacetic acid or an N-substituted aminoacetic acid is prepared and used as a tanning assistant, in a process for tanning leather in combination with, in particular, aluminum tanning agents.

8 Claims, No Drawings

CONDENSATES OF BIS-(4-HYDROXYPHENYL) SULFONE AS TANNING ASSISTANTS, THEIR PREPARATION AND USE IN THE TANNING OF LEATHER

The present invention relates to a condensate of bis-(4-hydroxyphenyl) sulfone, an aldehyde, a dialdehyde and/or glyoxylic acid and aminoacetic acid or an N-substituted aminoacetic acid as a tanning assistant, its preparation and use and a process for tanning leather using this condensate in combination with, in particular, aluminum tanning agents.

Chrome tanning is one of the most important tanning methods. However, there is increasing interest in chromium-free mineral tanning processes, for example because of the problem of eliminating chromium-containing wastewater or chromium-containing shavings. Instead of chromium compounds, other possibilities are, for example, aluminum, titanium or zirconium salts. However, particularly where aluminum compounds are used alone, the resulting leather has insufficient shrinkage temperatures. As a rule, shrinkage temperatures of 90° C., preferably 100° C., are desirable. Another disadvantage is that aluminum tanning agents are generally relatively easily washed out, ie. the leather has limited water resistance.

J. Amer. Leather Chem. Assoc. 76 (1981), 230–244 describes the combination of mimosa extract with aluminum compounds as an alternative to chrome tanning. The disadvantage of this tanning process is the brown coloration of the leather due to the mimosa extract and insufficient lightfastness of the tanned leather.

Condensates of phenols with formaldehyde and other aldehydes and amino compounds, such as amino acids, have long been familiar to the skilled worker. This type of reaction is disclosed in, for example, German Pat. No. 89,979 or V. J. Temkina et al., Z. Org. Chim. 7 (1971), 327. Condensates of bis-(4-hydroxyphenyl) sulfone with aldehydes and aminoacetic acid or an N-substituted aminoacetic acid were unknown to date or have not been used as tanning agents.

It is an object of the present invention to provide a tanning agent or a tanning assistant for a chromium-free tanning process, where the disadvantages of insufficient lightfastness and brown coloration of the mimosa/aluminum tanning are avoided.

We have found that this object is achieved by a condensate obtainable by reacting bis-(4-hydroxyphenyl) sulfone with a saturated aliphatic monoaldehyde of 1 to 4 carbon atoms or a dialdehyde of the formula

where n is an integer from 0 to 4, and/or with glyoxylic acid, if necessary in the form of an alkali metal salt, and with an unsubstituted aminoacetic acid or N-substituted, if necessary in the form of an alkali metal salt or ammonium salt, in a molar ratio of bis-(4-hydroxyphenyl) sulfone to aldehyde, dialdehyde and/or glyoxylic acid or its alkali metal salt to unsubstituted or substituted aminoacetic acid or one of its salts of 1:0.5–4:0.3–4, the molar amount of aminoacetic acid or its derivative being less than or equal to the molar amount of aldehyde, dialdehyde and/or glyoxylic acid, in aqueous or aqueous alcoholic solution, as a tanning assistant, its preparation, the use of this tanning assistant together with chromium-free mineral tanning agents, and a process for tanning leather in combination with, in particular, aluminum tanning agents.

The preferred molar ratios of bis-(4-hydroxyphenyl) sulfone to aldehyde, dialdehyde and/or glyoxylic acid to unsubstituted to substituted aminoacetic acid or its salt are 1:0.8–2.5:0.5–2.

The particularly noteworthy condensates are obtained from bis-(4-hydroxyphenyl) sulfone, formaldehyde or glyoxal and iminodiacetic acid or its alkali metal or ammonium salts.

The novel tanning process leads to a leather having high shrinkage temperatures of 90°–96° C. Compared with the known brown leather obtained in mimosa/aluminum tanning, the colour of the leather is ivory to white. The leather has very good lightfastness. Another advantage is that the pale natural colour remains unchanged even on prolonged storage at elevated temperatures of, for example, 60°–80° C.

The novel condensates are obtained by reacting bis-(4-hydroxyphenyl) sulfone with a saturated aliphatic monoaldehyde of 1 to 4 carbon atoms, a dialdehyde of the formula

where n is an integer from 0 to 4, or glyoxylic acid, if necessary in the form of an alkali metal salt, and unsubstituted or N-substituted aminoacetic acid, if necessary in the form of an alkali metal or ammonium salt, in molar ratios of bis-(4-hydroxyphenyl) sulfone to monoaldehyde, dialdehyde and/or glyoxylic acid or its alkali metal salt to unsubstituted or substituted aminoacetic acid or its salt of 1:0.5–4:0.3–4, the molar amount of aminoacetic acid or its derivative being less than or equal to the molar amount of aldehdye, dialdehyde and/or glyoxylic acid, in aqueous or aqueous alcoholic solution, if necessary in a closed system, at from 20° to 200° C. and at a pH of from 3 to 12.

Preferred condensates are obtained if 0.8–2.5 moles of aldehyde, dialdehyde or glyoxylic acid and 0.5–2 moles of aminoacetic acid or its derivatives are used per mole of bis-(4-hydroxyphenyl) sulfone, the molar amount of aminoacetic acid or its derivative always being less than or equal to the molar amount of aldehyde, dialdehyde or glyoxylic acid, at 50°–100° C. under atmospheric pressure and at a pH of 4–8.

Examples of aliphatic monoaldehdyes and dialdehydes are formaldehyde, acetaldehyde, propionaldehyde, n-butyraldehyde, isobutyraldehyde, glyoxal, malondialdehyde, succindialdehyde, glutaraldehyde, and adipaldehyde. They are preferably used in the form of an aqueous solution. It is also possible to use their open-chain or cyclic acetals, or polymer forms, eg. paraformaldehyde. The preferred aldehydes are formaldehyde, in particular in the form of its roughly 30% strength by weight aqueous solution, and glyoxal in the form of the usual aqueous solution of about 40% strength by weight.

Glyoxylic acid is used as the usual aqueous solution or as an alkali metal salt, in particular as the sodium salt of glyoxylic acid. It is also possible to use mixtures of glyoxylic acid and an alkali metal salt.

Suitable N-substituted aminoacetic acids are iminodiacetic acid, ethanolaminoacetic acid, glycine, ethylenediamine-N,N-diacetic acid and sarcosine, in each case in the acidic form or in the form of an alkali metal salt, in particular a sodium salt, or the ammonium salt. It is also possible to use mixtures of the acid with a salt. A preferably used aminoacetic acid is iminodiacetic acid, and an alkali metal or ammonium salt, in particular the sodium salt, are also preferably used.

Accordingly, the preparation of the condensates from bis-(4-hydroxyphenyl) sulfone, formaldehyde or glyoxal and iminodiacetic acid or a salt is particularly preferred.

The starting compounds can be combined in any order. Advantageously, the three starting components are initially taken in aqueous solution and are heated. Mixtures of the abovementioned aldehyde compounds or amino acids can, if required, also be used.

The preferred reaction medium is water. However, it is also possible to use aqueous alcoholic solutions employing lower, water-miscible alcohols, such as methanol, ethanol, n-propanol, isopropanol or a mixture of the stated alcohols, and, as a rule, 10-50% by weight, based on the weight of the water, of alcohol or alcohol mixture are added. Other water-miscible solvents which may be used are, for example, dioxane and acetonitrile.

The reaction is advantageously carried out at a pH of 3–12, preferably 4–8. The desired pH may be obtained by adding a base or acid, preferably an aqueous solution of an alkali metal hydroxide or of a mineral acid.

Temperatures of from 50° to 100° C. under atmospheric pressure are preferred. As a rule, the condensation is carried out at 80° C.

The condensation reaction is carried out, i.e. the stirred reaction mixture is heated, until, at the pH set and the prevailing temperature, there is no further change in the viscosity and the starting compounds are no longer detectable by chromatography.

In the condensation reactions described above, as a rule 10-80, preferably 30-60, % strength by weight aqueous solutions of starting materials are reacted while stirring. The solutions obtained, which are advantageously brought to solids contents of 10-80, preferably 30-60, % by weight, can be used directly in practice. The condensates can be obtained in powder form without difficulties by a conventional method, such as distilling off the solvent or, for example, spray drying.

The condensates are furthermore an excellent tanning assistant for tanning leather in conjunction with chromium-free mineral tanning agents, in particular with aluminum tanning agents.

The present invention furthermore relates to a process for tanning leather in an aqueous liquor, wherein the pickled pelts are treated with a condensate of bis-(4-hydroxyphenyl) sulfone, a monoaldehyde, a dialdehyde and/or glyoxylic acid or its alkali metal salt and, if required, an N-substituted aminoacetic acid, if necessary in the form of an alkali metal salt or ammonium salt as described above and defined in the claims, in an amount of 4-20% by weight, based on the pelt weight, at 20°-50° C., and then with an aluminum, zirconium or titanium compound as a mineral tanning agent in an amount of 4-16% by weight, based on the pelt weight, at 20°-45° C., the first and second stages being interchangeable, and the use of these condensates, as defined in the claims, as tanning assistants in conjunction with an aluminum, zirconium or titanium compound as a mineral tanning agent.

Further information in this context is as follows: the starting material usually comprises pickled pelts, for example cattle pelts having split thicknesses of 1.5-4 mm.

The aqueous liquor of the pickle bath is advantageously used in liquor ratios of 30-200%, preferably 50-100%.

The condensates to be used according to the invention are usually added to the pickle bath. In the novel tanning process, a pH of 2-5, preferably 2.5-4.0, is advantageously maintained in the first stage. The pH can be adjusted by adding, for example, sodium bicarbonate.

As a rule, the condensate is added in two parts, and drumming is carried out for a total of from 1 to 18 hours.

In the second stage, the mineral tanning agents used are, in particular, aluminum tanning agents, such as commercial aluminum sulfate or commercial basic aluminum chloride, for example with a basicity of about 65% and an alumina content of 22-23% or a basicity of about 20% and an alumina content of 16-18%.

These are advantageously added in an amount of 4-16%, preferably 6-12%, based on the pelt weight.

Drumming is carried out at 20°-45° C., preferably 30°-40° C., for 1-18, preferably 4-14, hours.

During incorporation of the mineral tanning agents by drumming, a pH of 2.0-4.0 is advantageous. After the mineral tanning agent has been incorporated, the pH is, as a rule, brought to 4.5-6, preferably 4.5-5.5, by adding sodium formate, sodium acetate, sodium bicarbonate or magnesium oxide.

When zirconium salts are used, the pH is, as a rule, not kept higher than 2.5.

As mentioned above, the two tanning stages can be interchanged in their order. The Examples which follow illustrate the invention. In the Examples, parts and percentages are by weight unless stated otherwise.

EXAMPLES

Analysis:

30% strength aqueous solutions of the condensates generally reach viscosities of from 10 to 500 mPa.s.sec$^{-1}$.

The IR spectra contain characteristic bands between 3450 and 2500 cm$^{-1}$ (OH—, COOH—, amine-, aromatic and aliphatic C—H stretching vibrations) and at 1630 cm$^{-1}$ (COO$^\ominus$ stretching vibrations).

Below 300° C., the defined melting point is not detectable.

Preparation Examples

EXAMPLE 1

125 g (0.5 mole) of bis-(4-hydroxyphenyl) sulfone, 100 g (1.0 mole) of 30% strength aqueous formaldehyde and 133 g (1.0 mole) of iminodiacetic acid are mixed, and 300 g of water are added. The resulting suspension is subsequently heated to 80° C., and the pH is then brought to 6.5 with 25% strength sodium hydroxide solution. After the mixture has been stirred for 4 hours at 80° C., HPLC and aldehyde titration are used to show that the starting materials are absent and there is no longer any change in the viscosity. After readily volatile components have been distilled off under reduced pressure of 30 mbar, an orange amorphous residue (249 g) is obtained.

EXAMPLE 2

125 g (0.5 mole) of bis-(4-hydroxyphenyl) sulfone 90 g (0.9 mole) of 30% strength formaldehyde and 52.2 g (0.4 mole) of iminodiacetic acid are mixed with 240 g of water. The experiment is continued similarly to that described under Example 1. A yellow amorphous residue (195 g) results.

EXAMPLE 3

Example 2 is repeated using a similar procedure; instead of iminodiacetic acid, its disodium salt is used in the form of a 30% strength aqueous solution.

EXAMPLE 4

250 g (1.0 mole) of bis-(4-hydroxyphenyl) sulfone are dissolved in 250 g of ethanol, and the pH is brought to 5.0 with 50% strength sodium hydroxide solution. A 40% strength aqueous solution of 104.4 g (0.8 mole) of iminodiacetic acid, which has been brought beforehand to pH 5.0 with 50% strength sodium hydroxide solution, and 130 g (1.3 moles) of a 30% strength formaldehyde solution are together added dropwise to this solution at 80° C. in the course of 3 hours. Thereafter, stirring is continued for a further hour at 80° C., after which HPLC and viscosity measurement show that the reaction has ended. After the solution has been concentrated and the solvent distilled off under reduced pressure, 351 g of an orange solid remain.

EXAMPLE 5

The procedure is similar to that of Example 1, using 125 g (0.5 mole) of bis-(4-hydroxyphenyl) sulfone, 75 g (0.75 mole) of 30% strength formaldehyde and 99.8 g (0.75 mole) of iminodiacetic acid at pH 6.

EXAMPLE 6

The Example is carried out similarly to Example 1, using 125 g (0.5 mole) of bis-(4-hydroxyphenyl) sulfone, 65 g (0.65 mole) of 30% strength formaldehyde and 79.8 g (0.6 mole) of iminodiacetic acid at pH 6.5.

EXAMPLE 7

The experiment is carried out similarly to Example 1, using 125 g (0.5 mole) of bis-(4-hydroxyphenyl) sulfone, 65 g (0.65 mole) of 30% strength formaldehyde and 66.5 g (0.5 mole) of iminodiacetic acid at pH 6.

EXAMPLE 8

The procedure is similar to that of Example 1, using 50 g (0.2 mole) of bis-(4-hydroxyphenyl) sulfone, 30 g (0.4 mole) of 30% strength formaldehyde and 21.3 g (0.16 mole) of iminodiacetic acid in 120 g of water at pH 5.5.

EXAMPLE 9

125 g (0.5 mole) of bis-(4-hydroxyphenyl) sulfone, 100 g (1.0 mole) of 30% strength aqueous formaldehyde and 133 g (1.0 mole) of iminodiacetic acid are mixed with 250 g of water and 250 g of ethanol, and the mixture is brought to pH 5.5 with 50% strength aqueous sodium hydroxide solution. The mixture is heated at the boil for 6.5 hours. After the volatile components have been distilled off under reduced pressure and the residue has been dried, 265 g of a yellow solid product remain.

EXAMPLE 10

Example 9 is repeated in a similar manner using 125 g (0.5 mole) of bis-(4-hydroxyphenyl) sulfone, 90 g (0.9 mole) of 30% strength aqueous formaldehyde and 53.2 g (0.4 mole) of iminodiacetic acid. 189 g of condensate result.

EXAMPLE 11

Example 9 is repeated in a similar manner using 125 g (0.5 mole) of bis-(4-hydroxyphenyl) sulfone, 100 g (1.0 mole) of 30% strength aqueous formaldehyde and 53.2 g (0.4 mole) of iminodiacetic acid. After the mixture has been concentrated and the residue dried, 195 g of condensate remain.

EXAMPLE 12

The experiment is carried out similarly to Example 9, using 125 g (0.5 mole) of bis-(4-hydroxyphenyl) sulfone, 65 g (0.65 mole) of 30% strength aqueous formaldehyde and 53.2 g (0.4 mole) of iminodiacetic acid. 185 g of condensate are obtained.

EXAMPLE 13

108.8 g (0.75 mole) of 40% strength aqueous glyoxal and 53.2 g (0.4 mole) of iminodiacetic acid are initially taken. The pH is brought to 6.5 with 50% strength aqueous sodium hydroxide solution. Thereafter, the mixture is heated to 80° C. and a solution of 125 g (0.5 mole) of bis-(4-hydroxyphenyl) sulfone in 250 g of ethanol is added dropwise in the course of 1 hour.

Stirring is then carried out for a further 5 hours at 80° C. Thereafter, by means of aldehyde determination and chromatography, it is shown that the starting materials are absent and furthermore that there is no change in the viscosity. After the volatile components have been removed and the residue dried under reduced pressure, 194 g of condensate are obtained.

EXAMPLE 14

The experiment is carried out similarly to Example 13, using 66.6 g (0.45 mole) of 50% strength aqueous glyoxylic acid instead of glyoxal, 26.6 g (0.2 mole) of iminodiacetic acid and 62.5 g (0.25 mole) of bis-(4-hydroxyphenyl) sulfone. After a total reaction time of 10 hours, the volatile components are distilled off and 115 g of condensate are obtained.

EXAMPLE 15

Example 13 is repeated in a similar manner, using 36.3 g (0.25 mole) of 40% strength glyoxal and 37 g (0.25 mole) of 50% strength aqueous glyoxylic acid instead of glyoxal. After a total reaction time of 8 hours, 195 g of condensate are obtained.

USE EXAMPLES

Use Example 1

100 parts of cattle pelts (split thickness 2.0 mm) are treated in a pickle bath consisting of 60 parts of water, 6 parts of sodium chloride, 0.6 part of formic acid and 0.6 part of sulfuric acid for 60 minutes.

A solution of 10 parts of the 100% pure condensate from Preparation Example 3, which has been diluted, at pH 4.0, with 90 parts of water, is added to this pickle bath at room temperature in two portions with an interval of 90 minutes, and drumming is carried out for a further 90 minutes.

Thereafter, 10 parts of a commercial aluminum chloride tanning agent (basicity 20%, $Al_2O_3$ content 16–18%) are added to the liquor, which is agitated overnight. Next morning, the pH of the liquor is from 2.1 to 2.3. 2 parts of sodium acetate are added and drumming is carried out for a further 60 minutes.

The temperature is then increased to 40° C., and the pH of the liquor is brought to 5.6 in the course of 6 hours by adding a total amount of 1.7 parts of magnesium oxide a little at a time.

The leathers are stored overnight. Thereafter, fatliquoring, acidification and finishing are carried out in 100 parts of fresh liquor. The leather has a shrinking temperature of 92° C. and is pale cream and very soft. It possesses good lightfastness and heat resistance.

USE EXAMPLE 2

10 parts of a commercial aluminum chloride tanning agent (basicity 20%, $Al_2O_3$ content 16–18%) are added to 100 parts of cattle pelts, pickled according to Use Example 1, in 60 parts of pickle liquor, and are incorporated by drumming at room temperature (25° C.) for 4 hours. Thereafter, a solution of 10 parts of the 100% pure condensate from Preparation Example 3, which has been diluted, at pH 4, with 90 parts of water, is added in 2 portions with an interval of 90 minutes, and the mixture is agitated overnight. Next morning, the liquor has a pH of 2.2. The pH is brought to 2.6 with 2 parts of sodium acetate and drumming is carried out for 60 minutes. The pH is then brought to 5.5 in the course of 6 hours with 1.7 parts of magnesium oxide at 40° C. The leathers are finished in the conventional manner.

After fatliquoring, they have a shrinking temperature of 92° C., are soft and pale and have good resistance to light and heat.

USE EXAMPLE 3

If, instead of the condensate stated in Preparation Example 1, the came amount of the condensate from Preparation Example 8 is used, similarly pale and soft leathers are obtained. They have a shrinking temperature of 94° C. In this case too, the leathers have good lightfastness and heat resistance.

USE EXAMPLE 4

If, instead of the 1.7 parts of magnesium oxide stated in Use Example 1, only 1.4 parts are used, the final pH obtained is 4.7. The leathers have a shrinking temperature of 91° C., are soft and pale and have good lightfastness and heat resistance.

USE EXAMPLE 5

Instead of the aluminum tanning agent stated in Use Example 1, 8 parts of another commercial aluminum tanning agent (basicity 65%, $Al_2O_3$ content 22–23%) are used.

The leathers prepared therewith, after they have been fatliquored, have a shrinking temperature of 92° C., are pale and soft and have good lightfastness and heat resistance.

USE EXAMPLE 6

If, instead of the condensate from Preparation Example 3, mentioned in Use Example 1, the same amount of the condensate from Preparation Example 2 is used, the leathers have a shrinking temperature of 90° C. after fatliquoring. They possess good lightfastness and heat resistance.

USE EXAMPLE 7

If, instead of the 1.7 parts of magnesium oxide stated in Use Example 1, 6.2 parts of sodium bicarbonate are used in the same period and the procedure is carried out at room temperature (25° C.), a final pH of 5.4 is obtained. After fatliquoring, the leathers have a shrinking temperature of 90° C. and possess good resistance to light and heat.

We claim:

1. A chromium-free process for tanning leather in an aqueous liquor, comprising:
   treating a pickled pelt with a condensate obtained by reacting (a) bis-(4-hydroxyphenyl)sulfone with (b) at least one member selected from the group consisting of a saturated aliphatic monoaldehyde of 1 to 4 carbon atoms, a dialdehyde of the formula:

$$OHC-(CH_2)_n-CHO$$

wherein n is 0 or an integer up to and including 4, a glyoxylic acid optionally in the form of an alkali metal salt, and mixtures thereof and (c) an unsubstituted or N-substituted aminoacetic acid optionally in the form of an alkali metal salt or ammonium salt, the molar ration of bis-(4-hydroxyphenyl) sulfone to aldehyde, dialdehyde, glyoxylic acid and mixtures thereof or alkali metal salts thereof to unsubstituted or substituted aminoacetic acid or salt thereof ranging from 1:0.5–4:0.3–4, the molar amount of aminoacetic acid or its derivative being less than or equal to the molar amount of aldehyde, dialdehyde, glyoxylic acid and mixtures thereof, in aqueous or aqueous alcoholic solution, the amount of condensate ranging from 4 to 20% by weight, based on the weight of pelt, at 20° to 50° C.; and then
   treating the treated pelt with from 4 to 16% by weight, based on the weight of pelt, of an aluminum, zirconium or titanium compound as a mineral tanning agent at 20°–45°, the two stages of treatment being interchangeable.

2. The process as claimed in claim 1, wherein said aliphatic monoaldehyde or dialdehyde is selected from the group consisting of formaldehyde, acetaldehyde, propionaldehyde, n-butyraldehyde, isobutyraldehyde glyoxal, malondialdehyde, succindialdehyde, glutaraldehyde, and adipaldeyde.

3. The process of claim 1, wherein said N-substituted aminoacetic acid is iminodiacetic acid, ethanolaminoacetic acid, glycine, ethylene diamine-N, N-diacetic acid or sarcosine.

4. The process of claim 1, wherein said molar ratio of ingredients ranges from 1:0.8–2.5:0.5–2.

5. The process of claim 1, wherein during the tanning step employing the condensate, the pH of the tanning medium ranges from 2 to 5.

6. The process of claim 1, wherein, during the tanning treatment with the organic condensate, drumming is conducted for a time of 1 to 18 hours.

7. The process of claim 1, wherein during the tanning treatment with a mineral agent, the basicity of the tanning medium is about 65% at an aluminum content of 22–23%, of the basicity is about 20% at an aluminum content of 16–18%.

8. The process of claim 1, wherein the pH of the tanning solution during the mineral tanning step ranges from 2 to 4.

* * * * *